Figure 1:
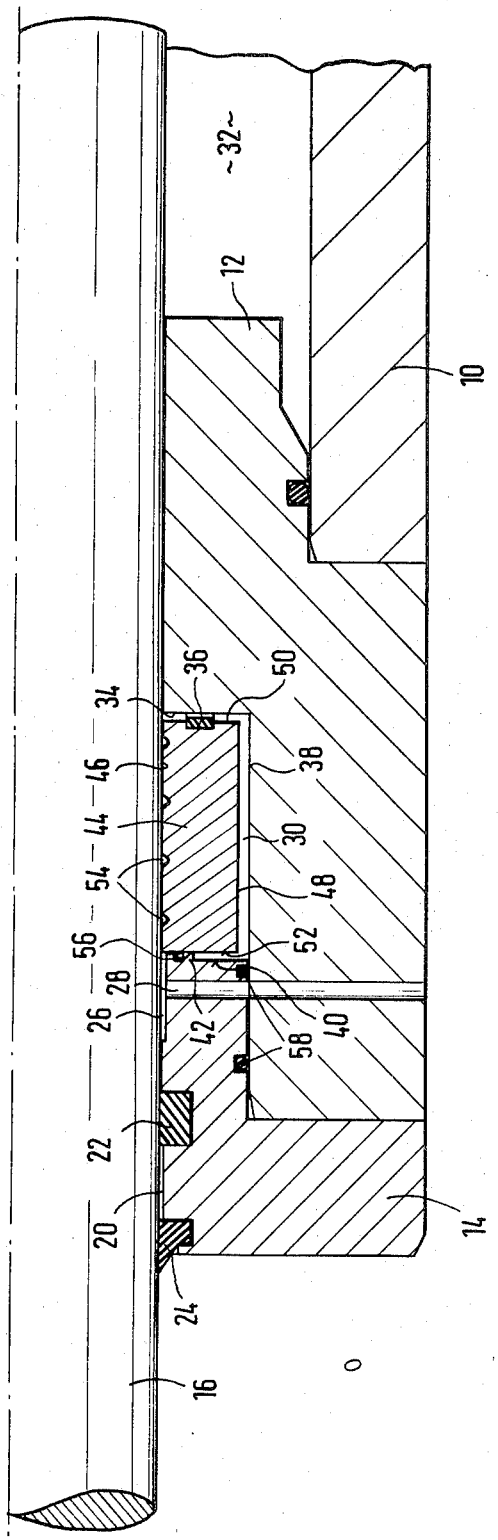

United States Patent [19]

Fabrowsky

[11] 4,406,463
[45] Sep. 27, 1983

[54] LOW-FRICTION SEAL

[75] Inventor: Hans-Dieter Fabrowsky, Neuhausen, Fed. Rep. of Germany

[73] Assignee: Herbert Hanchen KG, Ruit, Fed. Rep. of Germany

[21] Appl. No.: 266,008

[22] Filed: May 21, 1981

[30] Foreign Application Priority Data

Jul. 16, 1980 [DE] Fed. Rep. of Germany ....... 3026877

[51] Int. Cl.³ .............................................. F16J 15/44
[52] U.S. Cl. ...................................... 277/53; 277/173
[58] Field of Search ....................... 277/53, 27, 19, 30, 277/173

[56] References Cited

U.S. PATENT DOCUMENTS

| | | | |
|---|---|---|---|
| 2,079,302 | 5/1937 | Parks | 277/19 |
| 2,426,461 | 8/1947 | Lyddon | 277/53 |
| 2,543,615 | 2/1951 | Trumpler | 277/53 |
| 3,377,075 | 4/1968 | Feller | 277/53 |
| 3,743,303 | 7/1973 | Pope | 277/173 |
| 3,756,673 | 9/1973 | Strub | 277/27 |
| 4,289,264 | 9/1981 | Rawlins | 277/173 |
| 4,304,409 | 9/1981 | Orlowski | 277/53 |

FOREIGN PATENT DOCUMENTS 532215 12/1972 Switzerland .

Primary Examiner—Robert I. Smith
Attorney, Agent, or Firm—Shlesinger, Arkwright, Garvey & Fado

[57] ABSTRACT

A low-friction seal having a sealing ring seated in a groove formed by two relatively displaceable surfaces which are to be sealed, the ring resting by its periphery projecting from the groove against the surface to be sealed with a sliding fit, the sealing ring made of a dimensionally stable material and seated with axial and radial play in the groove, and means for pressure propagation between the groove sidewall closer to the pressure chamber and the sealing ring to the groove bottom using spacer means, and an axially projecting circumferential sealing ring provided between the groove sidewall away from the pressure chamber and the sealing ring, the active area of the sealing rim exceeding that of the spacer means between the sealing ring and the opposite groove sidewall.

16 Claims, 3 Drawing Figures

LOW-FRICTION SEAL

The invention relates to a low-friction seal, with a sealing ring seated in a groove subtended by two relatively movable surfaces which are to be mutually sealed, and resting by means of its inside and outside periphery with a sliding fit against the surfaces to be sealed.

For instance as regards the operation of precision hydraulic cylinders which are actuated from pressure-dependent or position-dependent pickups through control or regulating valves and which are used on permanent test stands for parts loaded by alternating stresses, the friction of the moved cylinder parts assumes large significance as an extensively unpredictable parameter. This applies both to the so-called inherent friction due to design and to the pressure-dependent friction generated by the sealing elements being forced harder, in the case of pressure-loading, against the moving piston rod (or, from the piston rod against the relatively moving cylinder wall), whereby the friction frequently is much changed, i.e. increased.

The resulting "stick-slip-effect", which is further much influenced by the composite effect of the sealing element, temperature, lubrication, surface quality of the part to be sealed and the rate of displacement of the said part, does often enough prohibit the use and hence the design-provided operation of hydraulic cylinders in view of the otherwise resulting defective results.

These conditions will be especially unfavorable when the control-regulation means cause a given pressure-loading of the cylinder, said load in principle sufficing to generate the test force predetermined by the test procedure and to be delivered by the cylinder. Because of the frictional losses depending in incalculable manner on the load pressure, an error is detected by the force/position-dependent pickup and fed back to the control/regulating valve which now might overcompensate the regulation on the basis of the unforeseeable pressure-dependent cylinder friction. These somewhat necessarily occurring regulation errors in turn cause deviations from the forces and the schedule of the predetermined test procedure, and therefore the test results are based on conditions unrelated to the actual state of affairs at the test sample.

It is the object of the invention to achieve a substantial enhancement in effectiveness by lowering especially the pressure-dependent frictional losses between relatively moving surfaces, for instance of hydraulic cylinders.

To solve this problem, a sealing means of the initially cited kind is proposed by the invention, namely that the sealing ring consisting of a dimensionally stable material is seated with axial and radial play in the groove, that spacing means permitting unhampered pressure propagation to the groove bottom are provided at that side of the groove which is closer to the cylinder pressure-chamber, and that the groove sidewall, or the sealing ring, away from the cylinder pressure chamber comprises a circular, axially projecting sealing rim of which the acting surface is less than the area of the spacers facing the sealing ring.

In a sealing means so designed, the pressure medium penetrates from the pressure chamber between the spacers into the groove bottom and attempts to escape past the sealing rim, yet it is prevented from doing so because the sealing ring is of a larger free surface at its end face opposite the spacers than the area covered-up by the sealing rim, and therefore is kept pressed against the sealing rim by the pressure propagating within the groove, whereby only negligible leakage losses are possible. In a way, therefore, the sealing ring is kept floating within the groove loaded by the pressure media.

Among other factors significant for the possible, lowered friction of the sealing means of the invention, is the fact that this seal need not assume guidance functions. As the pressure medium attempts to escape from the narrow gap, preferably the result of the play in the fit, between the surfaces to be sealed, for instance a piston rod and the periphery of the sealing ring, from the pressure chamber past the sealing ring, it thereby generates hydrodynamic forces whereby the pressure medium will be distributed in extensively uniform manner along the surface to be sealed (piston rod), with the tendency to maintain a concentric gap.

Compared to these hydrodynamic forces effecting self-centering of the sealing ring, the forces acting radially on the sealing ring remain without significance, as they essentially cancel out. In this manner an evenly distributed leakage oil flow is generated around the surface to be sealed (piston rod), the amount of which remains pressure-dependent, but which also may be kept relatively small, and which will be collected behind the seal in a drainage bore and removed from there. The concentric gap that is formed ensures hydrodynamic full lubrication which surprisingly leads to a large reduction in friction.

In an advantageous embodiment of the invention, the sealing ring is provided with cylindrical inside and outside surfaces, a substantial number of small ring grooves being arranged at lengthwise spacings in that sealing surface which is opposite the surface to be sealed. These ring grooves on one hand act as a labyrinth seal to keep the leakage small, and on the other hand they reinforce the tendency of the hydrodynamic forces to generate and maintain a concentric gap.

Preferably the sealing ring is metallic, however, when taking into account the applied operational pressures, other materials with adequate dimensional stability can also be used.

To make sure on one hand that the seal is at once operative with its advantageous effects the moment the pressure chamber is again pressurized after a stoppage, the sealing ring being pressed against the sealing rim by the initiated leakage oil flow, and on the other hand to stop the areal compression taking place at the sealing rim from becoming excessive, it is proposed that the sealing rim be farther away from the groove bottom than from the groove opening. In this manner the sealing rim, i.e. its ealing area, can be adequately relieved, it being immaterial whether the projecting sealing rim be integrated into the end face of the sealing ring or into the groove sidewall opposite the end face.

The sealing function of the sealing rim can be supported by an elastic sealing ring mounted radially within or without, preferably however within the circumferential sealing area forming the sealing rim. By this step, the areal compression acting on the sealing rim can be further reduced. In this manner can be appreciable part of the areal compression between the sealing rim and the end face of the sealing ring or the groove sidewall—which must be sufficiently small to keep the leakage rate small but cannot be determined exactly—can be eliminated by correspondingly sizing the differential area at the sealing ring, and be replaced with respect to the sealing function by the elastic sealing ring.

The sealing means of the invention is suited both to a cylindrical outside surface which must be sealed and to a cylindrical inside surface. When designed in corresponding manner, the sealing is equally suited for translational and rotary motions.

In the drawings, which form part of this application

Figure 2:
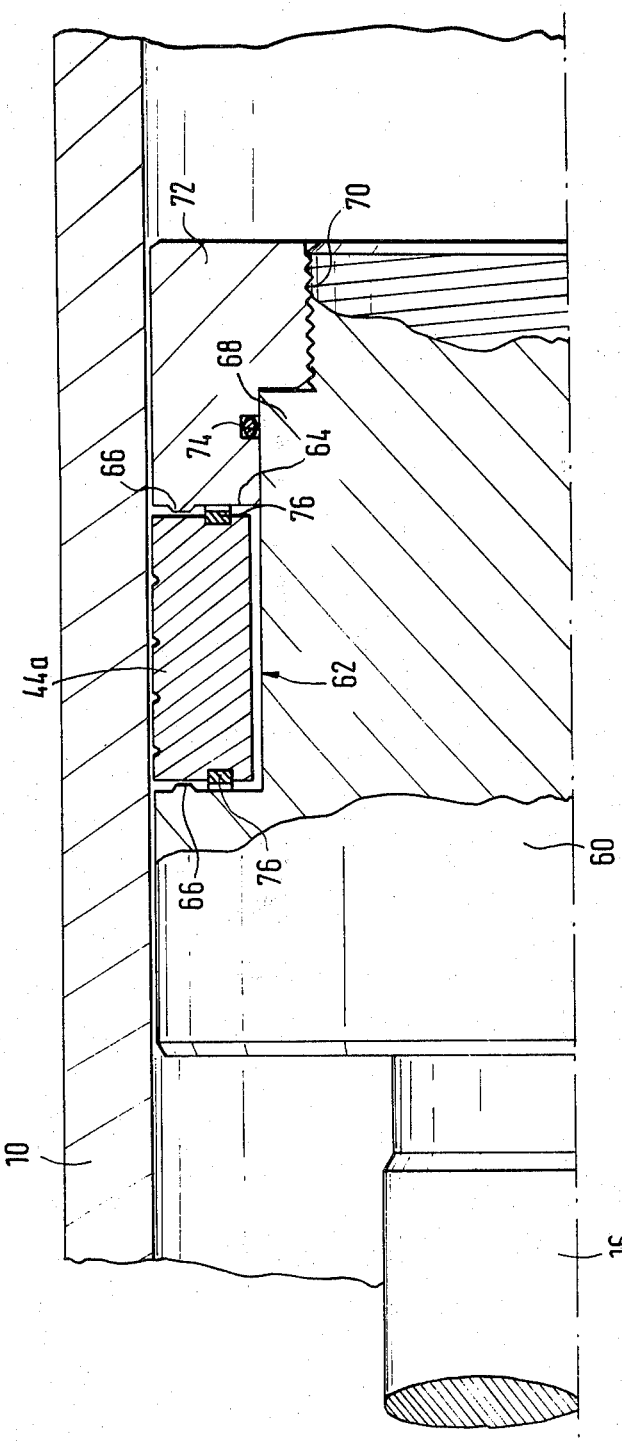
Figure 3:
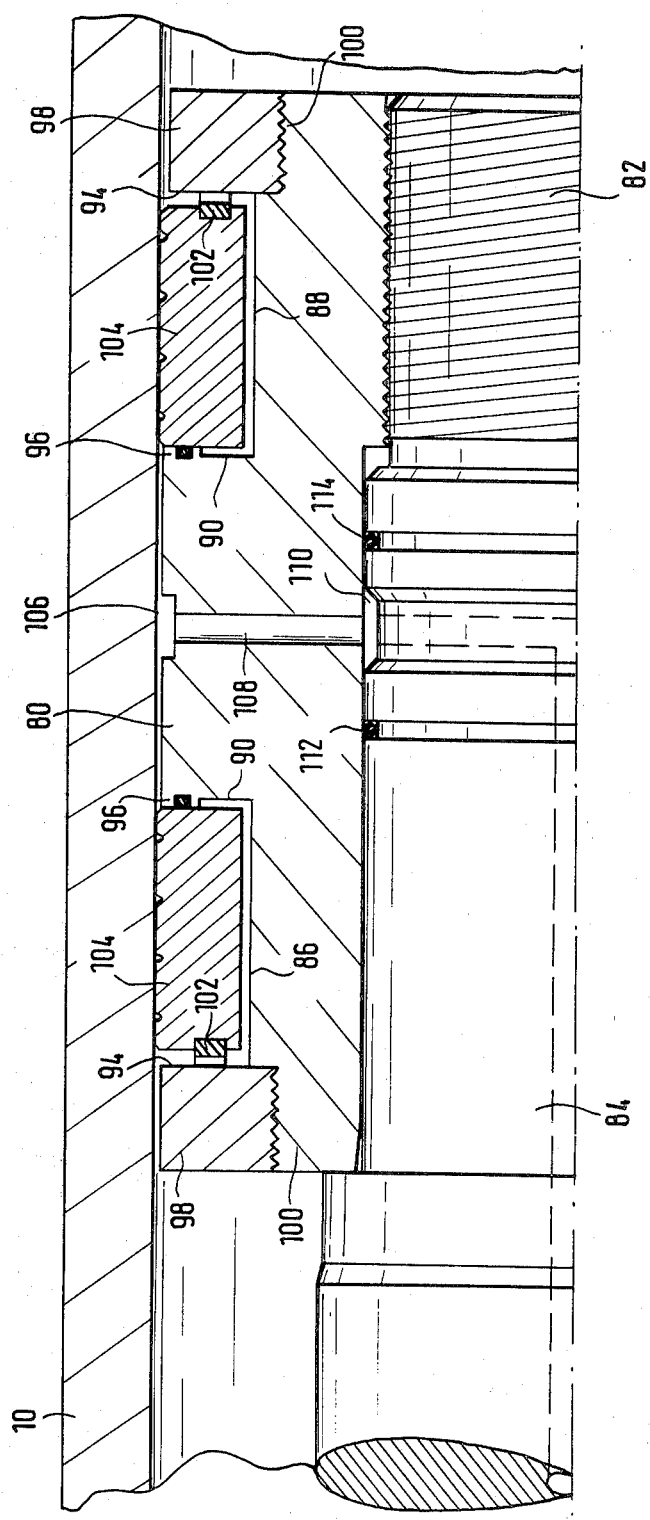

FIG. 1 is a schematic cross-section of a hydraulic cylinder at its end including a piston rod bushing;

FIG. 2 a schematic cross-section of a piston within a hydraulic cylinder;

FIG. 3 schematisch cross-section of another piston to show a further embodiment of the inventional seal.

According to FIG. 1 a guidance bush 12 penetrating the inside of the cylinder is set on the end of a hydraulic cylinder 10 and joined by means of a cover component 14 to the cylinder. The piston rod 16 may be guided using (omitted) slide rings seated in grooves of the guide bush 12 and the cover component 14. The cover bore 20 contains a sealing ring 22 and an external wiper ring 24. Also, a catch-ring groove 26 and a leakage oil drain bore 28 issuing from it are located in the cover component 14.

A cylindrical bore coming from the outer end of the guide bush 12 together with the adjoining clear end face of the cover component 14 forms an annular groove 30. At the sidewall 34 next to the pressure or oil space 32 of this annular groove spacer means, if appropriate, are provided, which are circumferentially arranged and between which flow paths leading to the groove bottom 38 are left open.

A circumferential sealing rim 42 axially projecting into the groove is located at the groove sidewall 40 away from the pressure chamber 32 and forms the inside end face of the cover component 14. This sealing rim consists of a radially extending surface with a groove therein to seat an elastic sealing ring 56.

A sealing ring 44 is seated in the groove 30; this ring consists of metal or another dimensionally stable material, for instance plastic with such properties. The sealing ring 44 comprises a cylindrical inside surface 46, a cylindrical outside surface 48, and an essentially radially extending end face 50 and 52 resp. The dimensions of the sealing ring 44 are such that it surrounds the piston rod 16 by its cylindrical inside surface 46 in sliding and seated manner and that it is arranged in the groove 30 so its other three outer surfaces 48, 50, 52 everywhere subtend some play with respect to the groove. In the embodiment shown, the groove 30 is located in the guidance bush 12; obviously it may also be located in another component in a device of a different design, where said component would be opposite the surface to be sealed, or would enclose it. The play between the sealing ring 44 and the groove 30 is just large enough that the pressure from the oil space 32—to the extent it is propagated through the fitted play between the guidance bush 12 and the piston rod 16, can spread unhampered as far as the groove bottom 38. The cylindrical inside surface 46 is provided with several small annular grooves 54 arranged preferably at equal separations from one another.

A spacer ring 36 shown in the drawing is provided as the spacer means between the groove sidewall adjoining the oil space 32 and the sealing ring 44; this spacer ring 36 is seated in a groove the sealing ring and contains axial openings or bores which remain clear and transmit the pressure medium unhampered to the groove bottom 38. In lieu of the embodiment shown, the sealing rim 42 also may project from the end face 52 of the sealing ring 44, and so be resting against the groove side wall 40.

The sealing behavior described takes place both if the piston rod 16 is pulled inward toward the pressure chamber 32 and if the piston rod is moved outward, as an excess pressure also exists in that case in the pressure chamber 32, or suitable steps having been taken to ensure this.

If the sealing ring is used for instance to seal a piston, then the groove in which it is seated will be located at the circumference of the piston, and the presently externally located sealing surface of the sealing ring—possible provided with a plurality of radial grooves—rests in sliding and seated manner against the inside of the cylinder tube. The sealing rim 42 in that case preferably will be located at the groove sidewall away from the pressure chamber. The cover component 14 is sealed with respect to the guidance bush 12 by sealing rings 58 on both sides of the leakage oil bore 12.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

FIG. 2 shows schematically the inventional seal applied to a piston 60 movable within a hydraulic cylinder 10, which at either end can be higher pressurized than at the respective other end. The piston 60 has a circumferential groove 62 with opposed identic sidewalls 64, each of which has a metallic sealing rim 66 projecting therefrom in axial direction. Groove 62 is formed by a piston body portion 68 of reduced diameter and by annular member 72 screwed onto a threaded end portion 70 of the piston body. The annular member 72 has one end surface forming the other sidewall 64 of groove 62, and an O-ring 74 in an internal groove to shut off bottom of groove 62 towards a threaded end portion 70.

As before, a sealing ring 44a of metal or other dimensionally stable material is accommodated in groove 62 with some play, while its outer cylindrical surface is in slide fit relation to inner surface of cylinder 10. Both ends of sealing ring 44a have an annular groove in which a resilient spacer ring 76 is seated to engage the respective opposite sidewall 64 radially inward from sealing rim 66. The spacer rings 76 contain openings or bores, which remain clear during any positional change of sealing ring 44a in order to transmit the pressure medium unhampered to bottom of groove 62. Due to the spring characteristic of the spacer rings 76 the sealing ring 44a normally is held centered between opposing sealing rims 66, such to avoid, when the cylinder is in upright or inclined position, that the sealing ring 44a by its own weight abuts one of sealing rims 66, which, for example, is that being adjacent the pressurized cylinder end, and so to induce a substantial leakage flow, until sealing ring 44a becomes finally shifted to the opposite sealing rim to cut off leakage flow along the bottom of groove 62.

Operation of sealing ring 44a in FIG. 2 substantially corresponds to that shown in FIG. 1. As soon as pressurized medium is admitted to the left or right end of cylinder 10, leakage flow will take place to intrude into the adjacent end of groove 62 from the circumference of piston 60, to pass over sealing rim 66 and continue through spacer ring 76 to the bottom of groove 62, and from there through openings of the other spacer ring 76 until opposite sealing rim 66, against which sealing ring 44a is pressed under the provision of this embodiment that the pressure values on opposite sides of piston 60 will remarkably differ from each other. Under such conditions sealing ring 44a will aleays be pressed against that sealing rim 66 which is opposite to the higher pressurized end of cylinder 10, i.e. sealing action is produced by a differential pressure, which is due to the non exposed surface portion of the end of sealing ring 44a between sealing rim 66 and inner surface of cylinder 10, in combination with the fact that one end of sealing ring adjacent the pressurized cylinder end is automatically exposed to higher pressure than the other end.

The piston 60 being free to radially move within the limits of its slide fit within the cylinder 10, will be hydraulically centered by means of sealing ring 44a in groove 62, as the pressure medium in condition of leakage flow tries to maintain this leakage through the space between bottom of groove 62 and inner side of sealing ring 44a as its maximum, which is met at concentric cylindrical cross-section of that space.

As at the beginning of operation the pressurized liquid admitted to the cylinder will pass across the respective sealing rim 66 with high velocity, such rim must be made from metal to withstand, and it is to be understood that an additional sealing ring 56 as shown in FIG. 1 associated to the sealing rim would be prematurely washed out or easily destroyed, presumably as well by cavitation, which takes place, if the leakage flow is suddenly interrupted, when sealing ring is pushed against sealing rim 66.

FIG. 3 schematically represents the inventional sealing principle when applied to the piston of a cylinder 10, in which on both sides of the piston may act, not only different but also, equal pressures, such that in the latter case movement of the piston is effected by the difference of exposed pressure surfaces. As under the condition of equal pressure on both sides of the piston the sealing ring 44a of FIG. 2 could not occupy any defined position and consequently not perform any sealing action, the solution of FIG. 3 has been conceived.

A collar-like piston body 80, which is screwed onto the threaded end 82 of piston rod 84, includes two circumferential grooves 86, 88 adjacent its ends, each having a side wall 90 with a sealing rim 96 axially projecting therefrom. The opposite side wall 94 of each groove is formed by a ring member 98 screwed onto a reduced threaded portion 100 at each end of piston body 80. In each of the groove 86, 80 a sealing ring 104 of metal or other dimensionally stable material is accommodated, and, as in FIG. 1, a resilient spacer ring 102 containing openings or bores, is seated in a groove at that end of each sealing ring, which is opposite to the end engaging the sealing rim 96. The spacer ring 102 acts to bias its sealing ring 104 towards the respective sealing rim 96.

The piston body 80 includes a circumferential groove 106 for collecting leakage oil, which groove is connected by means of radial bores 108 to a collection groove 110 of piston rod 84 for discharging the leakage out of the cylinder. On both sides of the collection groove 110 the piston rod includes static sealing rings 112, 114.

I claim:

1. A self-centering low-friction seal for shafts and the like, comprising:
    a. said seal including a ring support and a ring having front, rear and a pair of opposed generally parallel side surfaces;
    b. means on said front surface for sealing around a shaft;
    c. said ring support including groove means having generally parallel opposed side surfaces and a rear surface disposed there between;
    d. said seal ring being positioned within said groove means;
    e. spacer means between each of said groove side surfaces and said ring side surfaces and having means for permitting fluid flow between said ring side surfaces and said groove means; and,
    f. means for applying and maintaining fluid pressure against said ring rear surface and said ring front surface to co-axially center said ring around said shaft.

2. A self-centering low-friction seal as defined in claim 15, further comprising:
    a. said spacer means includes rim means projecting from one of said groove side surfaces and against one of said ring side surfaces and a spacer extending from said other one of said ring side surfaces and projecting against said other one of said groove side surfaces; and,
    b. elastic seal means adjacent said rim means.

3. A self-centering low-friction seal as defined in claim 2, further comprising:
    a. a plurality of spaced annular grooves on said front surface to permit lubrication of said shaft.

4. A self-centering low-friction seal as defined in claim 2, wherein:
    said rim means positioned to project against said ring at a point where the distance from said rear surface to said point exceeds the distance from said front surface to said point.

5. A self-centering low-friction seal as defined in claim 4, wherein:
    a. said rim means axially project parallel to said front surface and include a radially extending surface parallel to said side surfaces.

6. A self-centering low-friction seal as defined in claim 5, wherein:
    a. said elastic seal means mounted adjacent said rim means radially extending surface.

7. A self-centering low-friction seal as defined in claim 3, wherein:
    a. said groove means being located in a cylinder rod bushing surrounding said rod; and,
    b. said seal ring front surface slideably sealing said rod.

8. A self-centering low-friction seal as defined in claim 3, wherein:
    a. said groove means being circumferentially located around a cylinder rod; and,
    b. said seal ring front surface slideably sealing said rod.

9. A self-centering low-friction seal as defined in claim 8, further comprising:

a. an annular collecting groove in fluid communication with said groove means through a leakage bore for collecting fluid; and, b. means for conveying said fluid from said collecting groove.

10. A self-centering low-friction seal as defined in claim 9, wherein:

a. said spacer means includes elastic seal means having a number of apertures for permitting fluid flow between said ring side surfaces and said groove.

11. A self-centering low-friction seal as defined in claim 9, wherein:

a. said spacer means includes solid seal means having a number of radial bores for permitting fluid flow between said ring side surfaces and said groove.

12. A self-centering low-friction seal as defined in claim 8, wherein:

a. said groove means includes parallel side walls transverse to said rod axis;

b. axially projecting seal rims mounted in said groove side walls; and, c. said ring mounted equidistant from said rims when said cylinder rod is stationary.

13. A self-centering low-friction seal as defined in claim 4, wherein:

a. said seal ring includes upper and lower groove means for seating upper and lower resilient spacer rings, said spacer rings having radial bores for allowing fluid flow between said ring side surface and said groove; and, b. said spacer rings resiliently engage said groove parallel side walls and maintain said sealing ring equidistant from said side walls.

14. A self-centering low-friction seal as defined in claim 8, wherein:

a. said seal rims and said ring are metallic.

15. A self-centering low-friction seal as defined in claim 8 further comprising:

a. a pair of groove means equidistant from a plane extending transverse to said rod axis at said rod midpoint;

b. each of said grooves having an axially extending seal rim at said groove plane end;

c. sealing rings floatingly mounted in said grooves and including spacer rings mounted opposite said seal rims for allowing fluid flow between said rings side surfaces and said grooves;

d. a fluid collecting duct connecting said grooves; and, e. means for conveying said fluid from said collecting duct.

16. A self-centering low-friction seal for shafts and the like, comprising:

a. an axially displaceable cylinder rod;

b. a sealing ring having a bore, a top surface, a bottom surface an outer cylindrical surface, and axially spaced annular grooves circumferentially surrounding said bore and wherein said rod is slideably mounted in said bore and said bore having a diameter in excess of said rod diameter;

c. a bushing having a bore concentric with said ring bore and surrounding said rod and having an inner circumferential groove, said groove having an upper surface, a lower surface and a cylindrical surface there between and said groove adapted for receiving said ring and allowing axial and radial displacement of said ring;

d. spacer means mounted in said top surface and slideably contacting said upper surface and having a number of radially directed apertures for allowing fluid communication with a pressure chamber;

e. an axially projecting seal rim extending from said lower surface and acting as a bearing surface for a small portion of said bottom surface; and, f. wherein fluid pressure communicates with said groove through said apertures for self-centering said ring around said rod.

* * * * *